United States Patent
Fontana, Jr. et al.

(10) Patent No.: US 6,680,832 B2
(45) Date of Patent: Jan. 20, 2004

(54) CPP MAGNETORESISTIVE SENSORS WITH IN-STACK LONGITUDINAL BIASING AND OVERLAPPING MAGNETIC SHIELD

(75) Inventors: Robert E. Fontana, Jr., San Jose, CA (US); Kuok San Ho, Cupertino, CA (US); Jordan A. Katine, San Jose, CA (US); Jeffrey S. Lille, Sunnyvale, CA (US); Ching H. Tsang, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 300 days.

(21) Appl. No.: 09/853,352

(22) Filed: May 11, 2001

(65) Prior Publication Data

US 2002/0167768 A1 Nov. 14, 2002

(51) Int. Cl.$^7$ ................................................. G11B 5/39
(52) U.S. Cl. ..................................... 360/324.2; 360/319
(58) Field of Search ............................. 360/324.2, 319, 360/320, 321

(56) References Cited

U.S. PATENT DOCUMENTS

| 5,883,763 A |   | 3/1999 | Yuan et al. ................. 360/113 |
| 5,898,548 A | * | 4/1999 | Dill et al. ................... 360/319 |
| 6,023,395 A |   | 2/2000 | Dill et al. ................... 360/113 |
| 6,430,010 B1 | * | 8/2002 | Murdock .................... 360/319 |
| 6,466,419 B1 | * | 10/2002 | Mao ........................... 360/319 |
| 2002/0030947 A1 | * | 3/2002 | Chen et al. ................. 360/319 |

OTHER PUBLICATIONS

R. Rottmayer, et al. "A New Design for an Ultra–High Density Magnetic Recording Head Using a GMR Sensor in the CPP Mode," IEEE Transactions on Magnetics, vol. 31, No. 6, Nov. 1995, pp.2597–2599.

* cited by examiner

Primary Examiner—Craig A. Renner
(74) Attorney, Agent, or Firm—Thomas R. Berthold; Daniel E. Johnson

(57) ABSTRACT

A current-perpendicular-to-the-plane (CPP) magnetoresistive sensor or read head has a magnetic shield geometry that covers the side walls of the sensor structure to prevent side reading caused by magnetic flux entering from adjacent data tracks. The shield geometry includes a bottom shield with a substantially planar surface and a specially shaped top shield. The top shield has substantially vertical portions generally parallel to the side walls of the sensor structure, a horizontal top portion over the trackwidth region of the sensor, and horizontal side portions formed over the portions of the bottom shield on either side of the sensor structure. The insulating gap material that separates the bottom and top shields is in contact with the horizontal portions of the bottom shield and the side walls of the sensor structure.

9 Claims, 4 Drawing Sheets

CPP MAGNETORESISTIVE SENSORS WITH IN-STACK LONGITUDINAL BIASING AND OVERLAPPING MAGNETIC SHIELD

TECHNICAL FIELD

This invention relates in general to magnetoresistive (MR) read sensors or heads for magnetic recording systems, and more particularly to such sensors that operate in the "current-perpendicular-to-the-plane" or CPP mode.

BACKGROUND OF THE INVENTION

In certain types of MR read sensors or heads for magnetic recording systems, the sense current passes perpendicularly through the planes of the layers making up the sensor. Such sensors are called "current-perpendicular-to-the-plane" or CPP sensors. CPP sensors are distinguished from "spin-valve" type MR sensors widely used in commercially available magnetic recording disk drives because spin-valve sensors operate with the sense "current-in-the-plane" of the sensor layers, or in CIP mode.

One type of CPP sensor is a magnetic tunnel junction (MTJ) sensor comprised of two ferromagnetic layers separated by a thin insulating tunnel barrier layer and based on the phenomenon of spin-polarized electron tunneling. The response of a MTJ sensor is determined by measuring the resistance of the MTJ when a sense current is passed perpendicularly through the MTJ from one ferromagnetic layer to the other. The probability of tunneling of charge carriers across the insulating tunnel barrier layer depends on the relative alignment of the magnetic moments (magnetization directions) of the two ferromagnetic layers. In addition to MTJ sensors, giant magnetoresistive (GMR) type of MR sensors have also been proposed to operate in the CPP mode, as described by Rottmayer and Zhu, "A new design for an ultra-high density magnetic recording head using a GMR sensor in the CPP mode", *IEEE Transactions on Magnetics*, Vol 31, Issue 6, Part: 1, November 1995, pp. 2597–2599; and in U.S. Pat. No. 5,883,763.

One of the problems with CPP MTJ and GMR sensors is the ability to generate an output signal that is both stable and linear with the magnetic field strength from the recorded medium. If some means is not used to stabilize the sensing ferromagnetic layer in the CPP sensor, then magnetic instabilities and hysteresis (Barkhausen noise) will degrade the signal to noise performance of the sensor. The problem of sensor stabilization using a conventional tail stabilization approach is especially difficult in the case of a CPP sensor, like an MTJ MR read head, because the sense current passes perpendicularly through the ferromagnetic layers and the tunnel barrier layer, and thus any metallic materials used in the tails to stabilize the sensing ferromagnetic layer will short circuit the electrical resistance of the MTJ if they come in contact with the ferromagnetic layers.

IBM's U.S. Pat. No. 6,023,395 describes an MTJ MR read head that has a biasing ferromagnetic layer magnetostatically coupled with the sensing ferromagnetic layer of the MTJ to provide longitudinal bias to the sensing ferromagnetic layer. As shown in FIG. 1, this MTJ MR head is a sensor structure made up of a stack of layers formed between a bottom shield 10 and a top shield 12, the shields being typically formed of relatively thick highly magnetically permeable material, such as permalloy ($Ni_{100-x} Fe_x$, where x is approximately 19). The shields 10, 12 have generally planar surfaces spaced apart by a gap 53. The gap material 50, 52 on the sides of the sensor structure is an insulating material, typically an oxide such as alumina ($Al_2O_3$). The layers in the stack are a bottom electrical lead 20, the MTJ sensor 30, the longitudinal bias stack 40, and top electrical lead 22. The MTJ sensor 30 is made up of an antiferromagnetic layer 32, a fixed ferromagnetic layer 34 exchange biased with the antiferromagnetic layer 32 so that its magnetic moment cannot rotate in the presence of an applied magnetic field, an insulating tunnel barrier layer 36 in contact with the fixed ferromagnetic layer 34, and a sensing or "free" ferromagnetic layer 38 in contact with the tunnel barrier layer 36 and whose magnetic moment is free to rotate in the presence of an applied magnetic field. The longitudinal bias stack 40 includes a nonmagnetic electrically conductive spacer layer 42, a biasing ferromagnetic layer 44 that has its magnetic moment aligned generally within the plane of the device and is separated from the ferromagnetic layer 38 by the spacer layer 42, and optionally an antiferromagnetic layer 46 exchange coupled to the biasing ferromagnetic layer 44. The self field or demagnetizing field from the biasing ferromagnetic layer 44 magnetostatically couples with the edges of the sensing ferromagnetic layer 38 to stabilize its magnetic moment, and, to linearize the output of the device. The electrically conductive spacer layer 42 prevents direct exchange coupling between the biasing ferromagnetic layer 44 and the sensing ferromagnetic layer 38 in the MTJ sensor 30 and allows sense current to flow perpendicularly through the layers in the stack between the two leads 20, 22.

The width of the data tracks of the recorded media is determined by the trackwidth (TW) of the MR sensor, as shown in FIG. 1. The shielding geometry provided by shields 10, 12 of the MR sensor attenuates the flux coming from adjacent magnetic transitions of the recorded media along the downtrack direction (perpendicular to the layers in the stack) and therefore enhances the sensor's linear resolution. However, it has been discovered as part of the development of the present invention that for very small trackwidths this shielding geometry does not provide adequate suppression of side reading caused by flux coming from adjacent tracks.

What is needed is a CPP sensor with in-stack longitudinal biasing that does not suffer from side reading of adjacent data tracks.

SUMMARY OF THE INVENTION

The invention is a CPP magnetoresistive sensor or read head with a magnetic shield geometry that covers the side walls of the sensor structure to prevent side reading caused by magnetic flux entering from adjacent data tracks. The shield geometry includes a top shield that has nearly vertical portions generally parallel to the side walls of the sensor structure, horizontal side portions over the portions of the bottom shield on either side of the sensor structure, and a top horizontal portion over the top trackwidth region of the sensor. The insulating gap material that separates the bottom and top shields is in contact with the horizontal portions of the bottom shield and the side walls of the sensor structure. Because of the nearly vertical portions of the top shield, the distance from the bottom shield to the sensing layer of the sensor structure is greater than the gap thickness outside the sensor structure so that magnetic flux is generally prevented from entering the sides of the sensing layer.

For a fuller understanding of the nature and advantages of the present invention, reference should be made to the following detailed description taken together with the accompanying figures

DETAILED DESCRIPTION OF THE INVENTION

Figure 1:
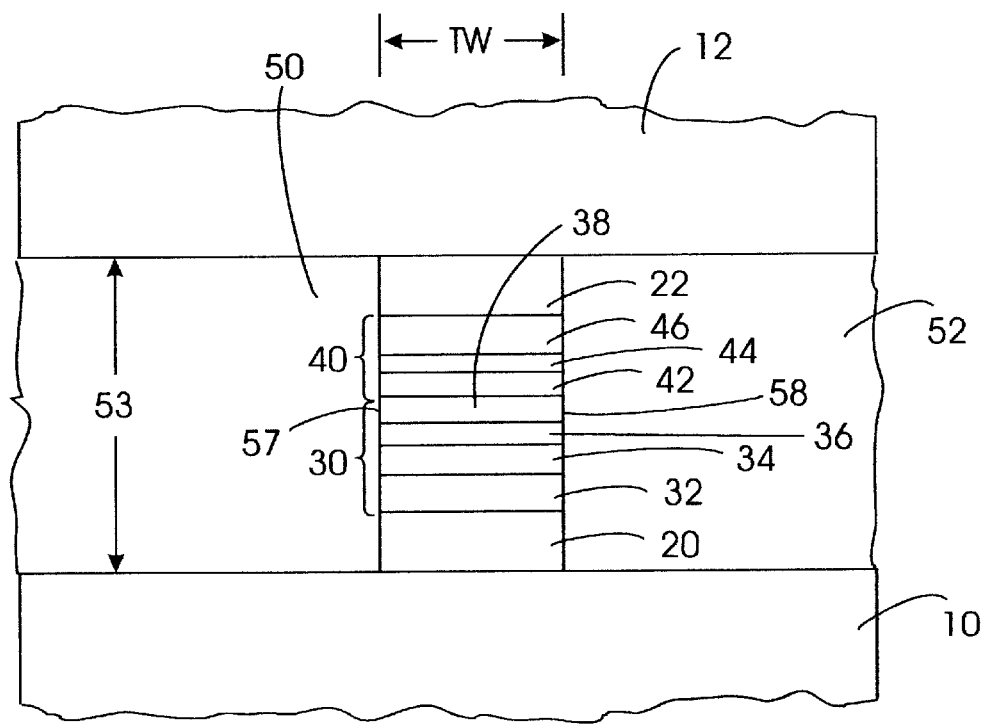
FIG. 1 is a schematic of a prior art MTJ type CPP sensor with in-stack longitudinal biasing with a conventional shield geometry.

It has been discovered that for very small trackwidths the shielding geometry provided by shields 10, 12 in FIG. 1 does not provide adequate suppression of side reading caused by flux coming from adjacent tracks. This flux leaks into the MTJ sensor 30 between shields 10, 12 on the sides of the MTJ sensor 30 through regions 50, 52 and into the sensing ferromagnetic layer 38 through its edges 57, 58. The regions 50, 52, which are formed of insulating material, typically an oxide such as alumina ($Al_2O_3$), define the spacing of the gap 53 between the shields 10, 12. It has been determined experimentally that significant signal degradation and side reading occurs from the off-track direction in MR sensors with small trackwidths (less than about 0.2 $\mu$m). One of the primary reasons for this has been found to be caused by insufficient flux shielding being along the off-track direction. The prior solution to the off-track side reading problem in conventional "spin-valve" and GMR "current-in-the-plane" (CIP) sensors has been to define narrower trackwidths lithographically without modifying the shielding geometry. However, below some critical trackwidth, this scaling method is insufficient because of the practical limitations in recording systems, such as the substantial magnetic spacing and the read gap length.

Figure 2:
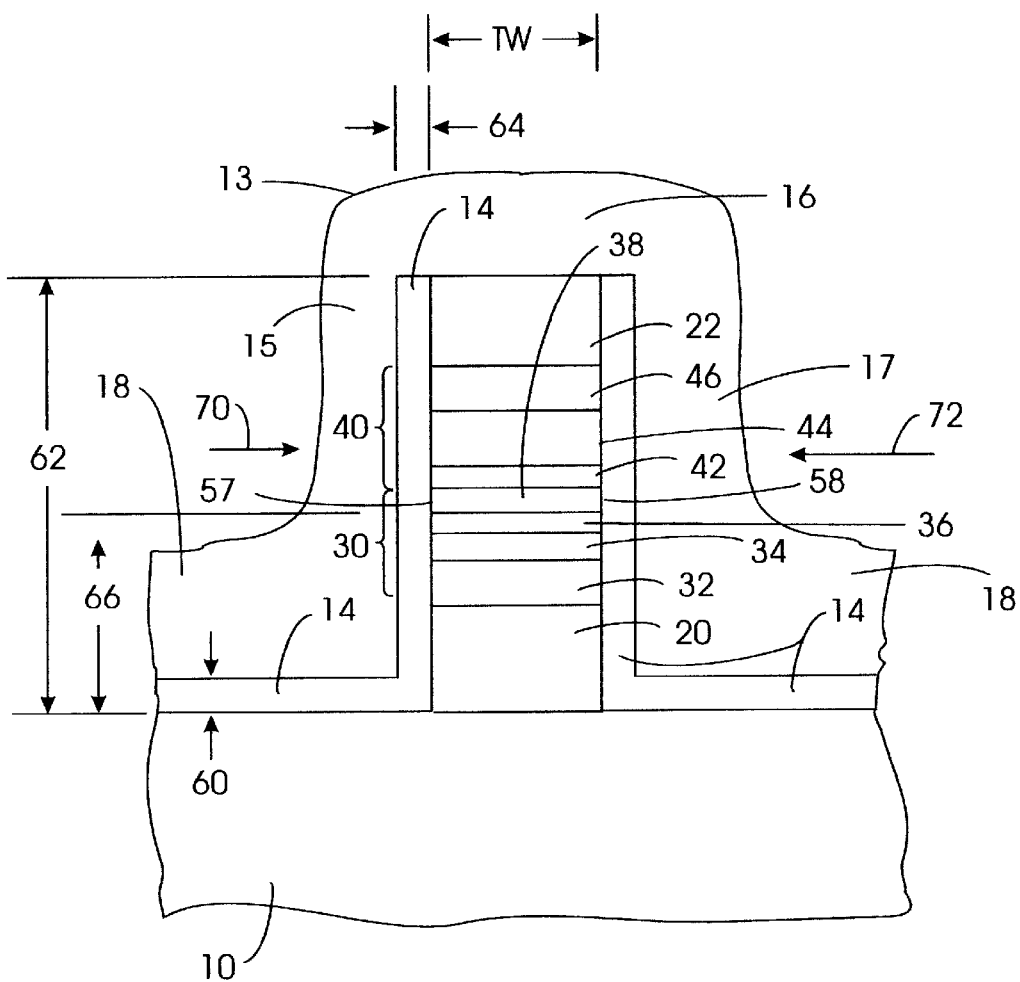
FIG. 2 is a schematic of an MTJ-type CPP sensor according to the present invention with in-stack longitudinal biasing and a shielding geometry to reduce off-track side reading.

In the present invention, a new shielding geometry is used with in-stack longitudinally-biased CPP sensors, such as MTJ read heads, to reduce the off-track side reading. FIG. 2 shows the new shield configuration for use with an MTJ type of CPP sensor. The gap 60 between bottom shield 10 and top shield 13 outside the sensor region is significantly reduced so that the oxide layer 14 in this region is very thin (thickness in the range of about 10 to 300 Å). The lower bound of the gap 60 is limited by electrical shorting between the top and bottom shields 13, 10. It is known from characterization of the MTJ barrier that gap 60 can be on the order of 10 Å and yet have substantial resistivity (in the range of about 100–200 k$\Omega$-$\mu m^2$). The gap 60 outside the sensor region is much smaller than that gap 62 inside the sensor region. The top shield 13 has a top portion 16 over top lead 22, substantially vertical side portions 15, 17 wrapped around the side walls of the MTJ stack 30, particularly the edges 57, 58 of sensing ferromagnetic layer 38, and a horizontal portion 18 on either side of the sensor structure. As a result of this special shape for the top shield, the flux coming into the sensor from the off-track directions, shown by arrows 70, 72, is accordingly reduced by the portions 15, 17 of top shield 13. This suppresses the off-track side reading and increases the trackwidth resolution of the sensor. In this scheme, it is preferable to have the sensing ferromagnetic layer 38 near the top of the MTJ sensor 30, so that the sensing layer is almost completely surrounded by the top shield, making the flux attenuation more effective.

To improve side reading, a necessary condition is to have vertical distance 60 be less than vertical distance 66. This makes the shield separation distance 60 outside the trackwidth region smaller than the shield separation distance 62 in the trackwidth region. Thus side flux is shielded from the tunnel junction sensor. This shielding can be further optimized as follows. The horizontal distance 64 between the substantially vertical side portions 15, 17 of top shield 13 and the edges 57, 58 of the sensing layer 38 is in the range of about 10 to 300 Å. The vertical distance 66 inside the sensor region from the substantially planar surface of shield 10 to the sensing layer 38 must be greater than the gap 60. Otherwise sensor performance will degrade by allowing side reading flux to better couple into the sensing layer 38. Because of this requirement, the vertical portions 15, 17 of the top shield 13 outside the sensor region will cover the full extent of the edges 57, 58 of the sensing layer 38 and thus suppress the side reading coming from the off-track directions 70, 72.

Figure 4:
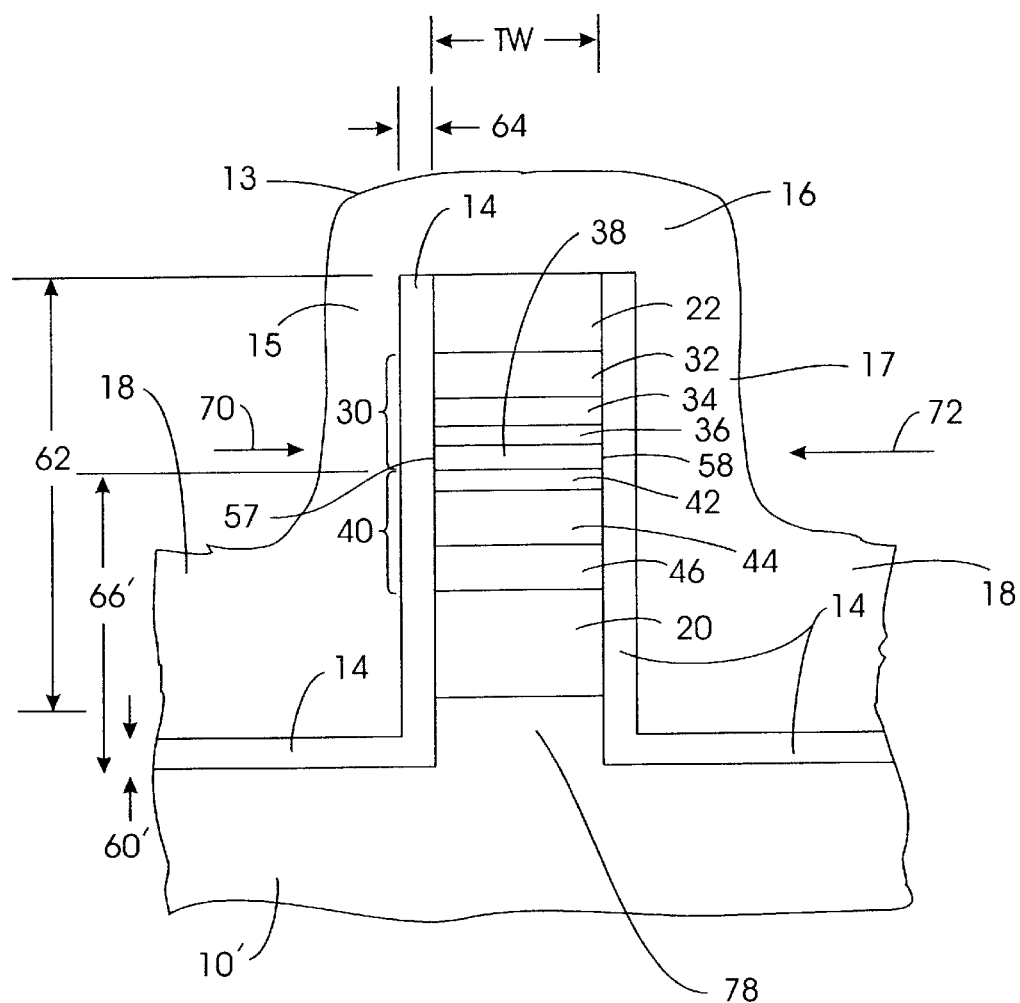
FIG. 4 is a schematic of an MTJ-type CPP sensor similar to the embodiment of FIG. 3, in which the bottom shield includes a pedestal region and the sensor layers have been inverted.

While the MTJ sensor 30 described and shown as part of the sensor structure in FIG. 2 has the fixed ferromagnetic layer 34 as the bottom ferromagnetic layer of the sensor, the MTJ sensor can also be formed by inverting the sensor layers so that the longitudinal bias stack 40 is in contact with bottom lead 20, i.e., so that the sensing ferromagnetic layer 38 is below the fixed ferromagnetic layer 34. In this type of "inverted" MTJ, as well as in the "conventional" sensor structure shown in FIG. 2, it may be desirable to form the central portion of shield 10 as a pedestal onto which the bottom lead 20 would be formed. The pedestal increases the distance of the sensing ferromagnetic layer from the bottom shield, to ensure that the top shield 13 adequately overlaps the side edges of the sensing layer. FIG. 4 shows such an arrangement, in which a pedestal region 78 forms part of the bottom shield 10'. Reference numeral 60' denotes the gap between the bottom shield 10' and the top shield 13, whereas the vertical distance from the substantially planar surface of shield 10' (outside the pedestal region 78) to the sensing layer 38 is denoted by reference numeral 66'.

Figure 3:
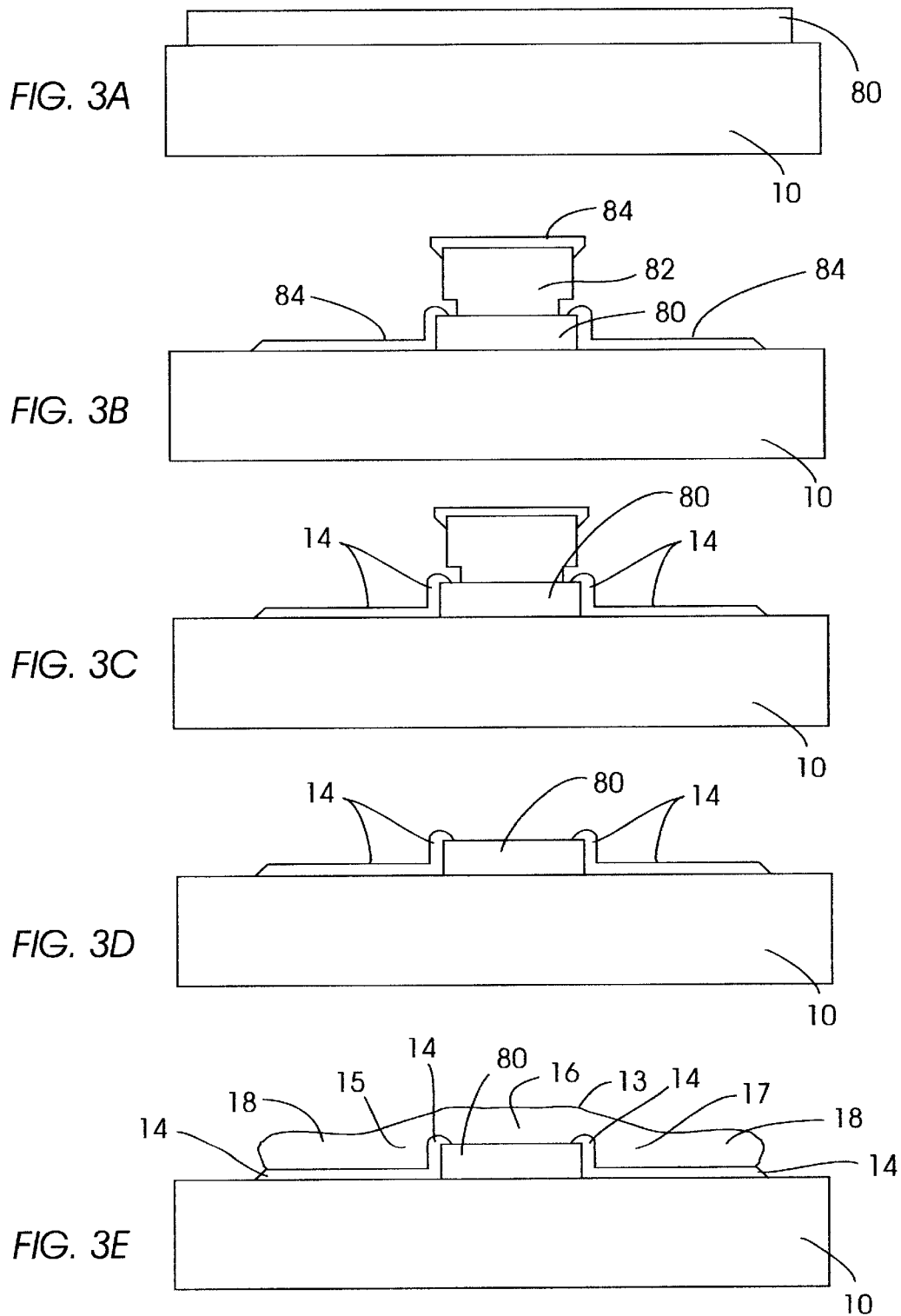
FIGS. 3A–3E are schematic views of the process steps in making the sensor shown in FIG. 2.

Referring now to FIGS. 3A–3E, the process for fabricating the sensor will be explained. First, as shown in FIG. 3A, the complete sensor structure 80, comprising the bottom lead, the sensor stack (including the MTJ sensor and the longitudinal bias stack) and the top lead, is deposited on the shield 10 by sequential deposition of all of the component layers. Next, in FIG. 3B, photoresist 82 is deposited and patterned and the trackwidth of the structure 80 is defined by ion milling, if it is desired to form a pedestal on the shield 10, for example if an inverted sensor structure is to be formed or if it is otherwise desired to increase the distance 66 (FIG. 2), then the ion milling would not be stopped at the interface of the structure 80 with the shield 10 but would continue until portions of the shield 10 outside the trackwidth were also milled away. After the trackwidth is defined an aluminum layer 84 is deposited over the photoresist 82. The aluminum layer 84 is oxidized by natural exposure to the atmosphere or by plasma oxidation in a vacuum to form a layer of alumina as the insulating oxide layer 14, as shown in FIG. 3C. Other metals that may be used instead of aluminum include tantalum, titanium and vanadium. The insulating oxide layer 14 can also be formed by directly sputter depositing the metal oxide or by sputter depositing silicon dioxide ($SiO_2$). As an alternative to an oxide, a nitride can be used as the insulating material. The nitride can be formed by directly sputter depositing aluminum nitride or silicon nitride, or by depositing aluminum or silicon in a nitrogen environment.

In FIG. 3D the photoresist is lifted off, and in FIG. 3E permalloy is deposited over the sensor structure 80 and oxide layer 14 to form the top shield 13. In addition to permalloy as the shield material, other materials that will provide the magnetic shielding include any highly magnetically permeable material, such as Sendust, NiFeCo, and Co based amorphous alloys. The materials, thicknesses and fabrication processes for the leads, sensor stack and longitudinal bias stack are well known and described in the art, for example in the previously cited patents and articles on CPP sensors.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A current-perpendicular-to-the plane (CPP) magnetoresistive sensor for reading magnetically recorded data from tracks on a magnetic recording medium comprising:

a first shield formed of magnetically permeable material and having a substantially horizontal planar surface;

a sensor structure on the planar surface of the first shield and having substantially vertical side walls defining a sensor trackwidth less than the width of the first shield, the sensor structure comprising a first electrically conductive lead on the first shield, a CPP sensor stack of layers including a sensing ferromagnetic layer, a biasing stack of layers for longitudinally biasing the magnetic moment of the sensing ferromagnetic layer, and a second electrically conductive lead over the biasing stack and the CPP sensor stack;

a layer of electrically insulating material including a horizontal portion on and in contact with the first shield and substantially vertical portions on and in contact with the side walls of the sensor structure; and a second shield of magnetically permeable material located over the sensor structure, the second shield including a central portion on the second lead, vertical portions on and in contact with the vertical portions of the insulating layer, and a horizontal portion on and in contact with the horizontal portion of the insulating layer, and wherein the thickness of the horizontal portion of the insulating layer is less than the vertical distance from the substantially planar surface of the first shield to the sensing ferromagnetic layer, wherein the first shield has a pedestal region raised above the substantially planar surface of the first shield, the pedestal region having a width substantially the same as the trackwidth, and wherein the first lead is formed on the pedestal region, the second shield overlapping side edges of the sensing ferromagnetic layer, thereby reducing flux coming into the sensing ferromagnetic layer from off-track directions.

2. The sensor according to claim 1 wherein the CPP sensor stack is formed on the first lead and the biasing stack is formed on the CPP sensor stack.

3. The sensor according to claim 1 wherein the CPP sensor is a magnetic tunnel junction sensor.

4. The sensor according to claim 1 wherein the biasing stack is formed on the first lead and the CPP sensor stack is formed on the biasing stack.

5. The sensor according to claim 1 wherein the insulating layer is an oxide of an element selected from the group consisting of aluminum, tantalum, titanium, vanadium and silicon.

6. The sensor according to claim 5 wherein the insulating layer is alumina.

7. The sensor according to claim 1 wherein the insulating layer is a nitride of an element selected from the group consisting of aluminum and silicon.

8. The sensor according to claim 1 wherein the first and second shields are formed of permalloy.

9. The sensor according to claim 1 wherein the thickness of the vertical portions of the insulating material on the side walls of the sensor structure is in the range of approximately 10 to 300 Angstroms.

* * * * *